United States Patent [19]

Ohmura et al.

[11] Patent Number: 4,493,542
[45] Date of Patent: Jan. 15, 1985

[54] PHOTOGRAPHIC CAMERA WITH HANDLE GRIP

[75] Inventors: Hiroshi Ohmura; Atsuo Kohno; Minoru Shiiba; Tsutomu Tanaka, all of Tokyo, Japan

[73] Assignee: Fuji Photo Film Co., Ltd., Kanagawa, Japan

[21] Appl. No.: 525,426

[22] Filed: Aug. 22, 1983

[30] Foreign Application Priority Data

Aug. 20, 1982 [JP] Japan .................................. 57-143345
Aug. 20, 1982 [JP] Japan .................................. 57-143347

[51] Int. Cl.³ ...................... G03B 29/00; G03B 17/02
[52] U.S. Cl. ........................................ 354/82; 354/288
[58] Field of Search ................... 354/202, 173.1, 275, 354/288

[56] References Cited

U.S. PATENT DOCUMENTS

| | | | |
|---|---|---|---|
| 3,084,606 | 4/1963 | Goldberg | 354/173.1 |
| 3,240,143 | 3/1966 | Koeber et al. | 354/288 X |
| 3,380,366 | 4/1968 | Olson | 354/82 |
| 3,599,553 | 8/1971 | Hansen et al. | 354/288 |
| 3,602,118 | 8/1971 | Oberheim | 354/288 |
| 3,810,200 | 5/1974 | Sakaguchi et al. | 354/275 X |
| 4,214,830 | 7/1980 | Schröder | 354/202 |
| 4,241,985 | 12/1980 | Globus et al. | 354/288 X |

*Primary Examiner*—Donald A. Griffin
*Attorney, Agent, or Firm*—Young & Thompson

[57] ABSTRACT

A photographic camera having a configuration like a thin box comprises a camera body and a handle grip. When the camera is used, the camera body is rotated relative to the handle grip through an angle of about 90° to be transverse to the handle grip. When not in use, the handle grip is aligned with the camera body. The handle grip is hollow to receive the camera body therein; and a support housing slidable and permanently disposed in the handle grip is rotatably secured to the camera body.

18 Claims, 10 Drawing Figures

PHOTOGRAPHIC CAMERA WITH HANDLE GRIP

BACKGROUND OF THE INVENTION

The present invention relates to a photographic camera and, more particularly, to a photographic camera with a handle grip rotatable through an angle of about 90° provided at the lower part thereof.

Miniature cameras such as a 35 mm camera, a 110 size camera or a disk-type camera have a camera body without a grip like that of an 8 mm motion-picture camera, mainly because of the small size and light weight of the camera body. Upon taking a picture with such a compact camera, it is essential, to avoid camera shake, to take a firm hold on the camera by applying the palms of photographer's hands on both sides of the camera body. However, to have to hold the camera with both hands is undesirable for fast photographing and easy handling.

On the other hand, there has been proposed a camera provided thereon with a case housing the camera body therein for the purpose of protecting the lens and the optical finder arrangement of the camera, which is disclosed in, for instance, Japanese Utility Model publication No. 36-3136, and Japanese Utility Model Unexamined publication No. 53-136134. With such a camera case, which is usually constructed to slide or swing laterally relative to the camera body, it is inconvenient to hold the camera by gripping the sliding case whilst taking a picture. Consequently, although such a camera may be advantageous because it is of the horizontal type and therefore is easy to hold, nevertheless there is a disadvantage to such camera that the camera has to be held by gripping opposite sides, that is, both the camera body and the sliding case.

OBJECTS OF THE INVENTION

An object of the present invention is to provide a camera which allows a one-hand hold of the camera body to provide stability when photographing.

A further object of the present invention is to provide a camera which is retractable so as to be small and compact when not in use.

A still further object of the present invention is to provide a camera of which the body can be received into the grip thereof when not in use.

Another object of the present invention is to provide a camera of which the handle grip is adapted to rotate through an angle of 90° relative to the camera body, the rotation of the handle grip causing the film to be advanced.

SUMMARY OF THE INVENTION

In pursuance of these objects, and of others which will become apparent hereafter, the invention is embodied in a photographic apparatus, particularly in a still camera, which comprises a camera body section and a handle grip serving as a protective case. The handle grip is supported by and is reciprocable relative to the camera body between first and second positions in which the handle grip respectively conceals and exposes the camera body. In the position wherein the camera body is exposed, the handle grip is turnable about an axis parallel to the direction of movement of the handle grip, through an angle of 90°.

When using the camera, the handle grip can be easily grasped in one hand. Consequently, the camera according to the present invention can be held as conveniently as if it were an 8 mm movie camera. On the other hand, when shutting the camera, the handle grip, that is, the protective case, can accommodate the entire camera body, leaving exposed only a compact external shape much like a thin box.

According to a preferred embodiment of the present invention, the accommodation of the camera body in the handle grip, that is, the protective case, permits reducing the height of the camera to half as well as protecting the optical system such as the taking lens, thanks to the use of the case as both protective case and handle grip.

In another preferred embodiment of the present invention, the camera can be operated easily in comparison with conventional cameras with a film winding knob or lever, because the turning operation of the handle grip relative to the camera body through an angle of 90° permits film to be wound automatically following an exposure.

DETAILED DESCRIPTION OF THE INVENTION

Figure 1:
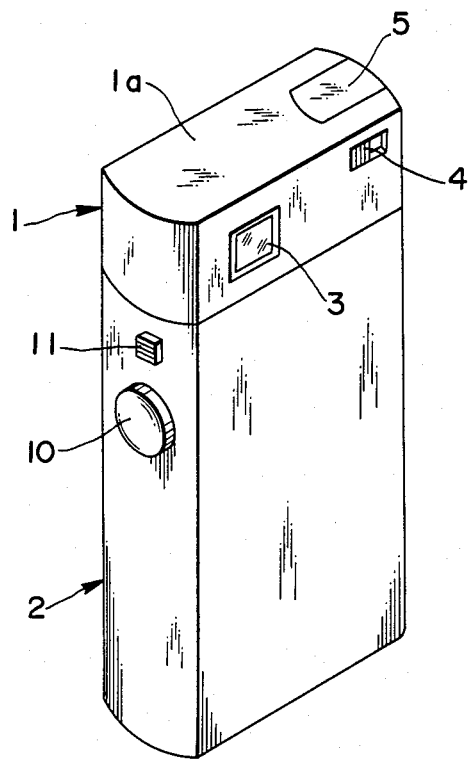
FIG. 1 is a perspective view of one embodiment of a still camera according to the present invention, the handle grip concealing the camera body.
Figure 3:
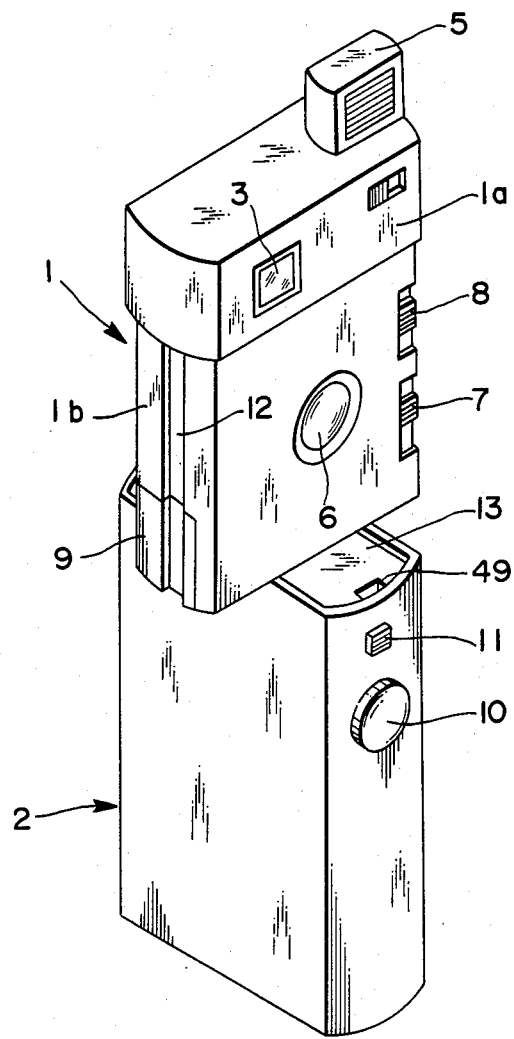
FIG. 3 is a perspective view of the camera in use, the camera body being turned relative to the handle grip through an angle of 90°.

Referring to FIGS. 1 and 3, there is shown a camera embodying the present invention which consists of a camera body and a handle grip adapted to accommodate the camera body therein. The camera body 1 has the shape of a thin box and comprises a top section 1a similar in profile to the protective case 2 and a lower section 1b adapted to be wholly accommodated within the handle grip, that is, protective case 2. The top section 1a is provided with a view finder 3, and a photo flash unit 5 which is caused to pop up by manipulating an operating member 4. On the other hand, built into the lower section 1b of the camera body are a taking lens 6, a focus adjusting member 7 of which the movement causes the taking lens 6 to move back and forth along its optical axis, a film speed setting member 8 and a back door or cover 9 which is opened and closed for loading a film cassette.

The handle grip 2, that is, the protective case, with the top end open, serves not only as a housing accommodating the lower portion 1b of the camera body 1 therein, but also as a handle grip.

The handle grip 2, that is, the protective case, protects the taking lens 6 when the lower portion 1b is retracted thereinto. As seen in FIG. 3, the handle grip 2 is provided with a shutter release member 10 on a front wall thereof and unlocking members 11 disposed on the front and a rear wall. Each unlocking member 11 has, as will be described in detail later, a hook lever extending inwardly which is engageable with either a recess 12a formed on the lower section 1b of the camera body 1 when the camera body 1 is fully nested with the protective case 2, or a recess 49a on a support housing 13 rotatably mounted on the bottom of the camera body 1 when camera body 1 is fully extended.

Figure 2:
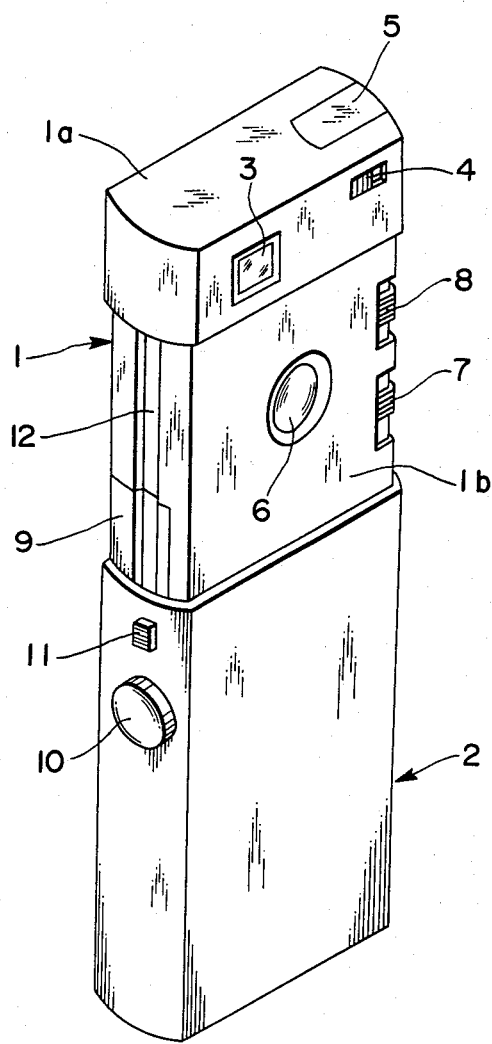
FIG. 2 is a similar perspective view of the camera with the handle grip moved to a position in which the camera body is exposed.

When out of use, the lower section 1b of the camera body 1, as shown in FIG. 1, is wholly accommodated in the protective case 2 so as to be compact for carrying and protection. But when it is intended to use the camera, the camera body 1 is pulled out upwardly as shown in FIG. 2 after pushing the unlocking members 11 so as to release their engagement with the recesses 12a on the lower section 1b of the camera body 1. Complete pulling out of the lower section 1b of the camera body 1 from the handle grip 2 allows the hooks of the unlocking members 11 to engage with the recesses 49a (see FIG. 5) so as to prevent further pulling out and to secure the extended position of the camera body 1, with the result that the camera body 1 is supported so as to be rotatable through an angle of 90° relative to the handle grip 2, that is, protective case 2 and relative to the support housing 13.

In the event of play in the camera body 1, it is necessary to overcome play both between the camera body 1 and the support housing 13 and between the support housing 13 and the protective case 2.

In the form of the camera shown in FIG. 1, the handle grip 2, that is, the protective case, is disposed crosswise relative to the orientation of the camera, making it awkward to hold. Besides, when holding the camera in photographing position, it will be necessary to take a different grip from the grip in which the camera is carried around by one hand. For this reason, the camera of this invention is adapted to allow the camera body 1 to rotate through an angle of 90° relative to the protective case 1 or handle grip. Furthermore, the rotation of the camera body 1 effects winding of the film loaded therein.

As is apparent from FIGS. 3 and 6, the rotation of the camera body 1 through an angle of 90° permits the film to be wound and causes the camera to be cross-shaped in external appearance, the camera body 1 being transverse to the handle grip 2. Consequently, to hold the handle grip 2 with one side surface in the palm of the hand allows the photographer to hold the camera in a most natural position so as to provide an easy operation of shutter release. In this way, with one hand holding the handle grip 2, that is, the protective case, the finger on the shutter release member 10 is easily pulled to actuate the shutter mechanism for taking a picture. Such one-hand operation makes it convenient to take snapshots.

Although in this embodiment the handle grip 2 is so designed as to leave the top section 1a of the camera body 1 outside thereof, it is easy for those skilled in the art to modify it so as to accommodate the camera body 1 completely. Furthermore, it is desirable to provide a spring member (not shown) between the base housing 13 and the inside bottom of the handle grip 2 so as to cause the camera body 1 to emerge automatically upon releasing the unlocking members 11.

Figure 4:
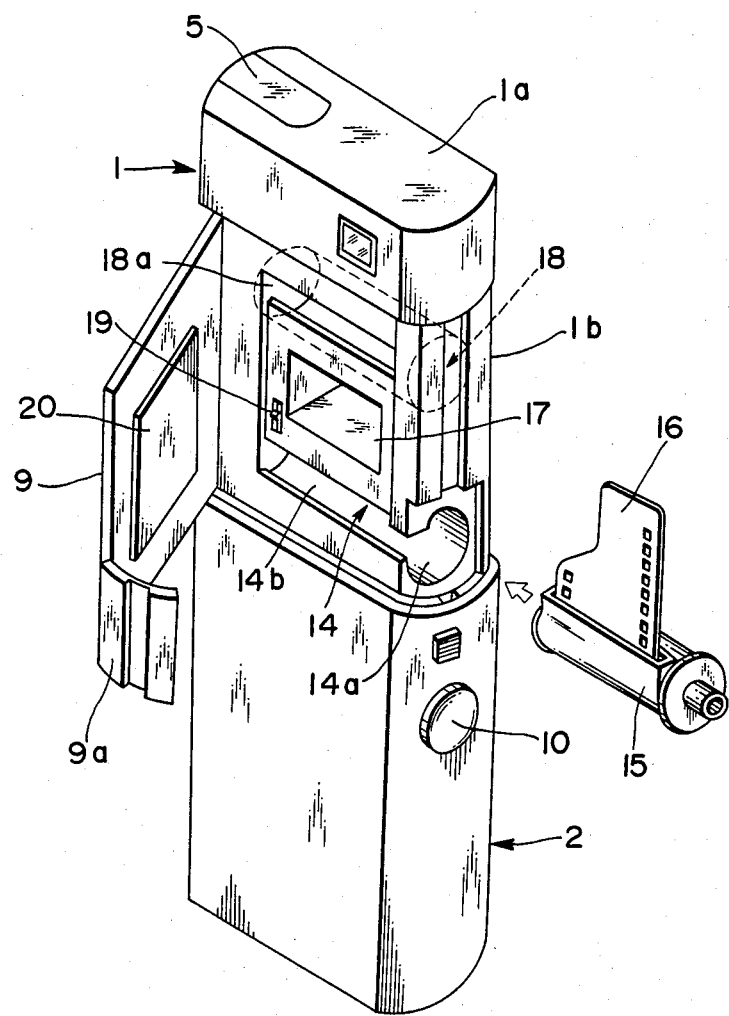
FIG. 4 is a view similar to FIG. 2 but showing the back door or cover of the camera opened to load a film container.

The camera body 1 includes a back door or cover 9 with a bent portion 9a which, as shown in FIG. 4, is hinged to the left-hand side of the lower section 1b of the camera body 1 so as to be movable relative to the camera body 1. A loading or supply chamber 14 in the camera body 1 is shaped to receive and hold the film container 15. The loading chamber 14 is accessible for film container loading only at the right-hand side of the lower section 1b of the camera body 1, through an entrance opening 14a having a diameter a little larger than that of the container 15. To load the film container 15 and the film leader 16 into the camera, the container 15 is inserted axially, into the loading chamber 14 through the entrance opening 14a; at the same time, the film leader 16 is passed through an elongated opening 14b. An example of a loading chamber like this is disclosed in detail in Japanese patent application Ser. No. 55-186574 of the same applicant.

The film leader 16 drawn out of the film cassette 15 is advanced from the elongated opening 14b of the film loading chamber 14, across the exposure frame 17, and into a take-up chamber 18 through a slot-like entrance opening 18a. In the take-up chamber 18 a known take-up spool and an automatic film threading mechanism are provided to wind the film automatically onto the take-up spool.

The camera is designed to be available for use with half-size format film of 4×17 mm, so as to double the shootable number of frames compared with full-size film, and to make the camera body 1 low in height and compact. As seen in FIG. 4, since the camera is adapted to advance the film in the vertical direction, the exposure frame 17 is disposed crosswise, which is different from conventional half-size format cameras. The crosswise disposition of the exposure frame 17, which is a feature of the camera, is convenient for those users who are familiar with full-size format cameras, as these latter usually have a crosswise-disposed exposure frame. The present invention can be, of course, provided in full-size format cameras; and even in this case the vertical advance of film makes it possible to realize compact cameras smaller in size than the conventional 35 mm full-size format cameras now marketed. Consequently, the handle grip serving as a protective case for the camera body thus designed, can be reduced in cross section so as to allow even photographers with small hands to hold firmly the handle grip with one hand.

In this embodiment, the camera operator inserts the film cassette 15 axially into the film loading chamber 14 and then the film leader 16 into the take-up chamber 18, and finally closes the back door 9. In response to closure of the back door 9, a locking mechanism, not shown, locks the back door 9 in closed position and a well-known pressure plate 20 bears against and maintains the film flat. Furthermore, the bent portion 9a of the back door 9 conceals the entrance opening 14a of the film loading chamber 14 to block light. As is conventional and well known to those skilled in this art, in the case of indoor or night photography the photo-flash unit 5 built into the top section 1b of the camera body 1 pops up to provide artificial light.

Figure 5:
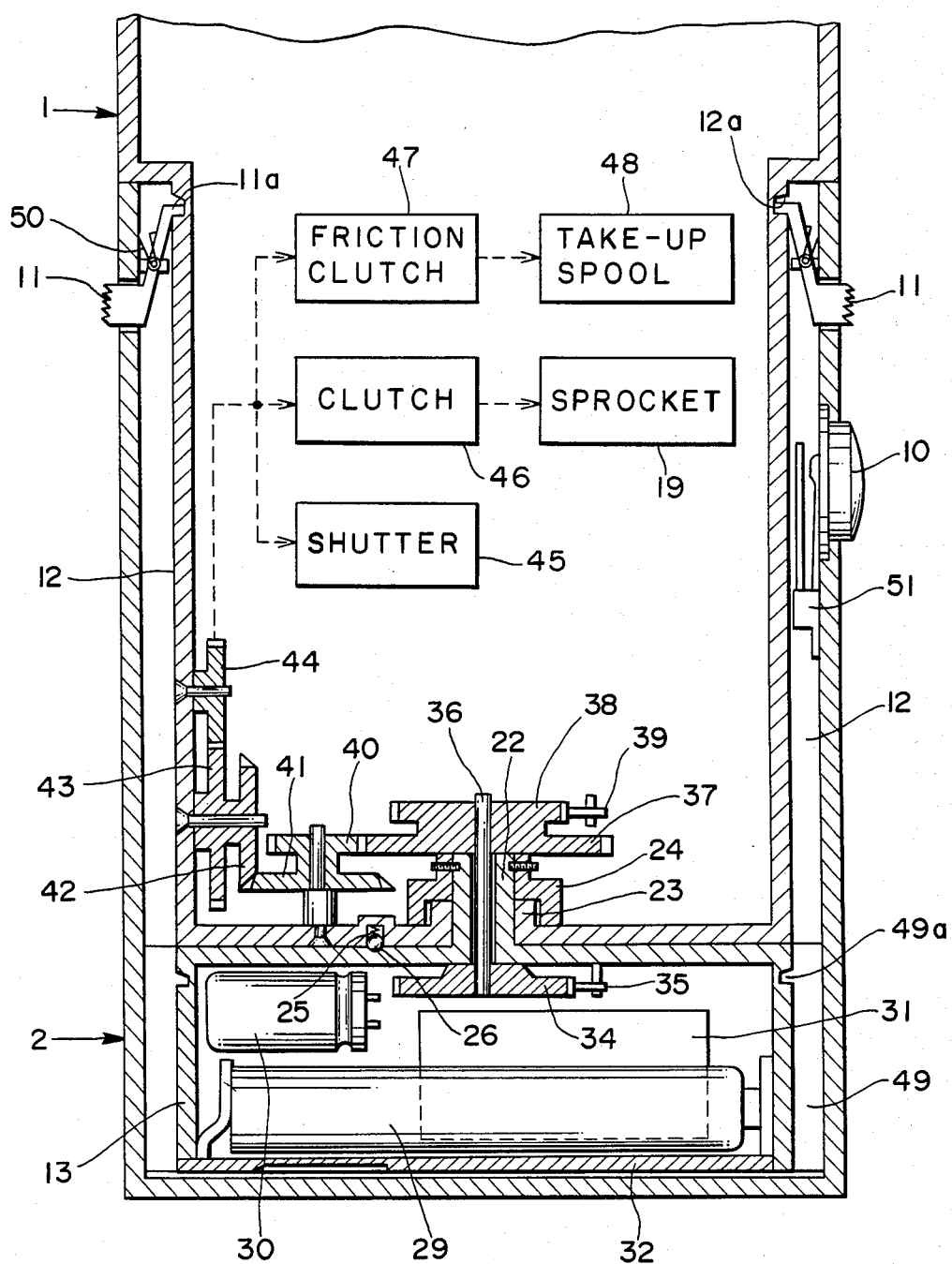
FIG. 5 is a partially fragmentary, enlarged longitudinal section of the essential camera mechanism.
Figure 6B:
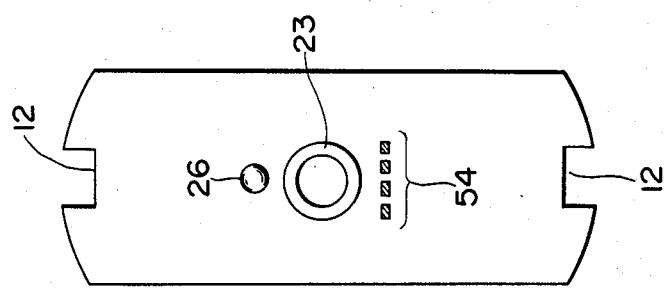
FIGS. 6A and 6B are a top view of the support housing and a bottom view of the camera body, respectively.
Figure 6A:
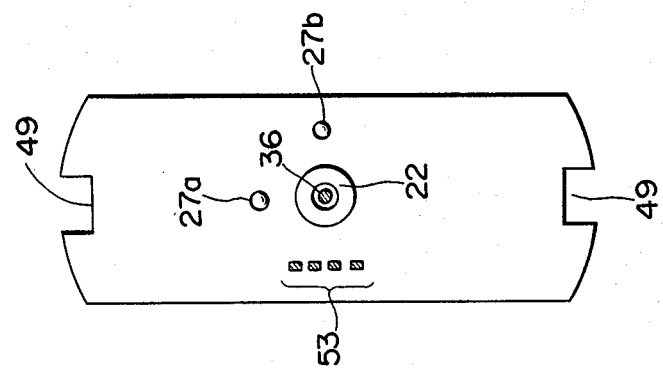

In FIG. 5, there is shown the camera in partial longitudinal section with the camera body 1 retracted into the handle grip. Provided around the center of the base housing 13 is a sleeve 22 on which another sleeve 23 formed at the bottom of the camera body 1 is rotatably fitted and secured thereto by a fastening member 24 so as not to come off. If providing the sleeves 22 and 23 on both the camera body and base housing at the same end of each, the camera in use is almost L-shape. Provided on the underside of the bottom of the camera body 1 is a click stop mechanism comprising a spring 25 and a click ball 26, the click ball 26 being engageable with a snap action in recesses 27a and 27b on the top face of the base housing 13 as shown in FIGS. 6A and 6B so as to fix the camera body 1 either in a first position wherein the latter remains in alignment with the base housing or in a second position wherein the camera assumes an almost cross-shaped configuration. It is preferable to make the base housing 13 sufficiently large for the stable and strong support of the camera body 1. In order to make the camera compact as a whole, the support housing 13 is hollow so as to accommodate such essential elements as battery 29, capacitor 30 for a flash lamp, and circuit plate 31 on which is disposed an exposure control circuit, flash control circuit and/or other circuit. By removing a slide cover 32 provided at the bottom of the support housing 13, the battery 31 can be replaced.

Within the hollow supply housing 13 there are provided a ratchet wheel 34 fixed to the lowermost end of the shaft 36 rotatably supported by the sleeve 22 and a ratchet 35 which is fixed to the top plate of the support housing 13 and which engages the ratchet wheel 34. The ratchet assembly 34, 35 is widely known as a film winding mechanism. That is to say, the rotational movement of the camera body 1 from the first position to the second position causes the ratchet to engage with and then to rotate through an angle of about 90° the ratchet wheel 35. Conversely, the rotational movement of the camera body 1 from the second to the first position causes the ratchet 35 to disengage from the ratchet wheel 34, as a result of which the ratchet wheel 34 cannot be rotated.

The rotational movement of the ratchet wheel 34 is transferred through the rotatable shaft 36 to a gear 37 with a ratchet wheel 38 integral therewith located within the camera body 1. An arrangement of the gear 37 and a pawl 39 engageable with the gear 37 prevents reverse movement of the gear 37 upon disengagement of the ratchet wheel 34 from the ratchet 35.

Consequently, a gear 44 is caused to rotate only when the camera body 1 is moved from the first position shown in FIG. 2 to the second position shown in FIG. 3 so as to cock a well-known shutter mechanism 45 and simultaneously to rotate the sprocket wheel 19 through clutch means 46 and a take-up reel 48 through frictional clutch means 47. Such mechanisms and a rewinding mechanism (not shown), which are well-known to those in the art, are diagrammatically shown.

As seen in FIG. 3, formed on both side walls of the lower section 1b of the body and the support housing 13 are continuous grooves 12 and 49 in which hooks 11a of the unlocking members 11 ride. Each hook 11a can be engaged with either a recess 12a at the uppermost end of the groove 12 when the camera body 1 is fully retracted into the handle grip 2 serving as protective case or another recess 49a in groove 49 when fully pulled out. Upon pushing the unlocking members 11 against their springs 50, the hooks 12a are forced to leave the recesses 12a or 49a. It should be noted that the support housing 13 can be removed from the handle grip 2 by pulling the camera body 1 out of the handle grip 2 with the unlocking members 11 held depressed, thereby to give access to the battery 29.

A switch member 51 for electromagnetically releasing the shutter is disposed in the groove 12 and fixed to the inner wall of the handle grip 2 or protective case. The switch member 51, in turn, is so designed as to turn on when the shutter release member 10 is operated, resulting in the actuation of the shutter mechanism.

FIGS. 6A and 6B show the top of the support housing and the base of the camera body, respectively. On the top of the support housing 13 there are two recesses 27a and 27b separated by an angle of 90° from each other, and a group of contact points 53 for a flash unit, a shutter control unit or the like. On the base of the camera body 1 there are provided a click ball 26 and a group of contact points 54 corresponding to the former group of contact points 53. The click ball 26 can engage with either the recess 27a when the camera body 1 remains in registry with the handle grip 2 as shown in FIG. 2 or the recess 27b when the camera body 1 is rotated clockwise through an angle of 90° as shown in FIG. 3. The rotational movement of the camera body 1 relative to the handle grip 2 is thus limited.

Upon engagement of the click ball 26 with the recess 27b, the group of contact points 53 is brought into contact with the counter contact points 54 to permit supplying electric power to the units in the camera body 1. As the contact points 53 and 54, in turn, serve as switches, it is preferable to use a pair of contact points as a power supply switch or main switch so as to render the camera either operable or inoperable merely by turning the camera body 1 relative to the handle grip 2.

In order to prevent rotation of the camera body 1 relative to the handle grip 2 more than an angle of 90°, it may be desirable to provide a pin-groove mechanism comprising, for instance, a pin projecting from the top of the support housing 13 and a quadrant groove in the bottom of camera body 1 in which the pin can engage.

Figure 7:
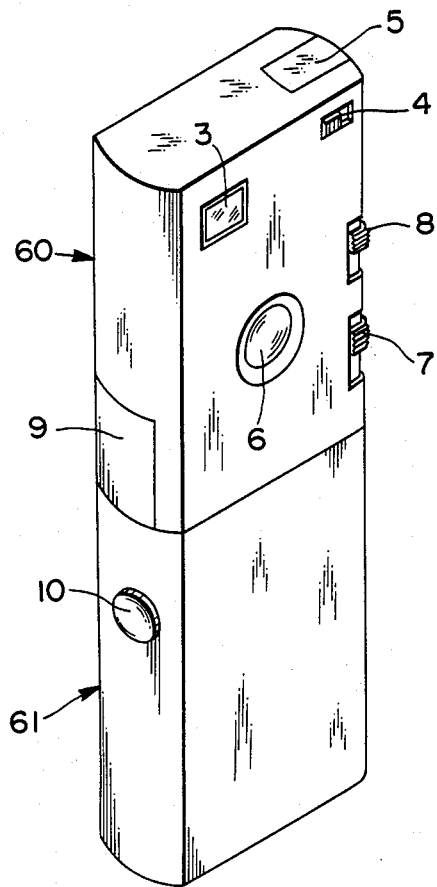
FIG. 7 is a perspective view of another embodiment of a still camera according to the present invention.
Figure 8:
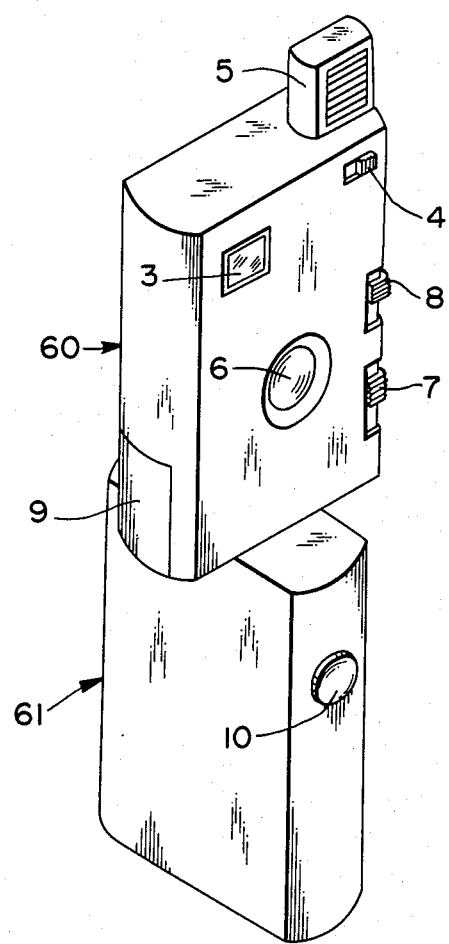
FIG. 8 is a view similar to FIG. 7 but with the handle grip moved to a position in which the camera body is turned through an angle of 90°.

Referring to FIGS. 7 and 8, there is shown another camera embodying the present invention which is provided with a rotatable handle grip having no function as a protective case. In this embodiment, the camera body 60, which is always exposed, is rotatably coupled to the handle grip 61 which has a configuration similar to the camera body 60. When the camera is not in use, the camera is configured overall much like a thin box. On the other hand, the camera body 60 or the handle grip 61 is relatively rotated through an angle of about 90° to be cross-shaped when the camera is in use. It is similar to the camera shown in FIG. 5 in that essential elements having an immediate connection with image forming are housed in the camera body 60 and the others are housed in the handle grip 61, and in that the rotational relative movement between the camera body 60 and the handle grip 61 causes the loaded film to be wound frame by frame.

Figure 9:
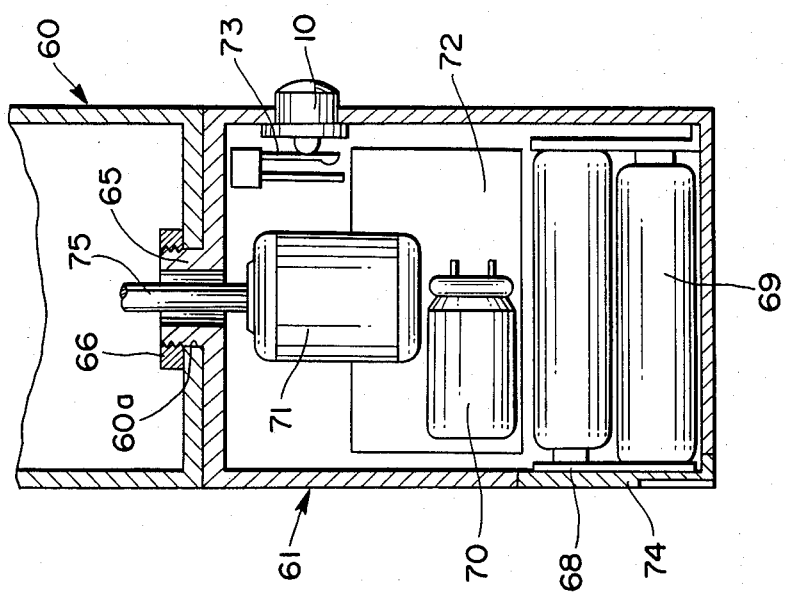
FIG. 9 is a partially fragmentary, enlarged longitudinal section of the handle grip of a further embodiment of the invention, including a driving motor therein.

FIG. 9 shows still another camera embodying the present invention, which is of the type having an electric motor in a handle grip for film winding. The handle grip 61 at its center is provided with a sleeve 65 which rotatably fits into an opening 60a formed at the bottom of the camera body 60 and which is fastened by, for instance, a nut 66. The combination of the sleeve 65 and the opening 60a allows the camera body 60 to rotate relative to the handle grip 61. If the sleeve 65 is provided at the marginal end of the handle grip 61, the camera swings to an L-shaped configuration.

In the same manner as described for the camera shown in FIGS. 7 and 8, elements having no immediate connection with image forming such as batteries 68, 69, a capacitor 70 for a flash unit, an electric motor 71, a circuit board 72 on which an exposure control circuit or the like is printed or otherwise provided, a switch 73 for the electromagnetically released shutter mechanism which is depressed by the shutter releasing member to turn on, or the like, are housed. By opening a slide cover 74, the batteries 68 and 69 can be accessible to replace them. The shaft 75 of the motor 71 passes through the sleeve 65 to enter into the camera body 60. Such camera is operated by pushing the shutter release member 10 to turn the switch 73 on so as to actuate the shutter mechanism. Immediately after the completion of shutter actuation, the motor 71 starts to rotate so as to initiate film winding and to charge the shutter mechanism in a well-known manner.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as included therein.

What is claimed is:

1. A photographic camera comprising a flattened camera body containing means for forming an image; and a flattened handle grip rotatably coupled to the bottom of said fastened camera body, said flattened handle grip being in alignment with the flattened camera body when the camera in not in use and being rotatable out of alignment with the flattened camera body through an angle of about 90° relative to the flattened camera body so as to be disposed transverse to the flattened camera body when the camera is in use.

2. A photographic camera as defined in claim 1, said camera body having a film loading and a film take-up chamber located at top and bottom thereof so as to advance a loaded film in a vertical direction.

3. A photographic camera as defined in claim 1, said handle grip having a shutter release member on its front side.

4. A photographic camera as defined in claim 1, said handle grip having a battery therein and contact points on the top of said handle grip movable into contact with contact points on the bottom of said camera body when the camera is in use, to supply power from said battery to said camera body.

5. A photographic camera as defined in claim 4, said handle grip containing an electric motor which is powered by said battery and whose rotation is transferred to picture-taking mechanism within said camera body.

6. A photographic camera as defined in claim 1, said relative rotation through an angle of about 90° between said handle grip and camera body actuating a film-winding mechanism in said camera body.

7. A photographic camera as defined in claim 1, said handle grip and camera body having the shape of flat boxes.

8. A photographic camera comprising:
 a camera body containing picture-taking mechanism therein;
 a support housing rotatably coupled to the bottom of said camera body; and
 a handle grip for slidably receiving all of said support housing and a part of said camera body therein, said handle grip and support housing being rotatable through an angle of about 90° relative to said camera body when said camera body is outside of said handle grip so that said handle grip and camera boy are disposed transverse to each other.

9. A photographic camera as defined in claim 8, said handle grip having a shutter actuating member on its one side.

10. A photographic camera as defined in claim 8, said handle grip having a film loading and a film-take-up chamber located at top and bottom in the sliding direction of said camera body so as to advance the loaded film in a vertical direction.

11. A photographic camera as defined in claim 8, said handle grip enclosing said support housing both when said camera body is pulled out of said handle grip and when said camera body is retracted into said handle grip.

12. A photographic camera as defined in claim 8, and click-stop mechanism for releasably securing said camera body relative to said support housing both when said camera body is in alignment with said support housing and when said camera body is rotated through an angle of about 90°.

13. A photographic camera as defined in claim 8, said support housing enclosing a battery.

14. A photographic camera as defined in claim 13, said camera body and support housing having a plurality of interengageable electric contacts so disposed that said camera body is fed with electric power upon said camera body being rotated by an angle of 90°.

15. A photographic camera as defined in claim 8, said camera body including a ratchet wheel which is engageable with a ratchet provided in said support housing, said ratchet wheel advancing a film within the camera when said camera body is rotated by an angle of about 90° relative to said handle grip.

16. A photographic camera as defined in claim 15, said support housing being hollow so as to accommodate said ratchet and ratchet wheel.

17. A photographic camera as defined in claim 16, said ratchet wheel in said support housing being attached to an end of a rotatable shaft which projects at the opposite end into said camera body through a sleeve for rotatably coupling said camera body and support housing with each other.

18. A photographic camera as defined in claim 8, said handle grip and camera body having the shape of flat boxes.

* * * * *